US010608401B2

(12) United States Patent
Vasilyev et al.

(10) Patent No.: US 10,608,401 B2
(45) Date of Patent: Mar. 31, 2020

(54) MID-IR KERR LENS MODE LOCKED LASER WITH NORMAL INCIDENCE MOUNTING OF POLYCRYSTALLINE TM:II-VI MATERIALS AND METHOD FOR CONTROLLING PARAMETERS OF POLYCRYSTALLINE TM:II-VI KERR LENS MODE LOCKED LASER

(71) Applicants: Sergey Vasilyev, Oxford, MA (US); Michael Mirov, Oxford, MA (US); Igor Moskalev, Oxford, MA (US)

(72) Inventors: Sergey Vasilyev, Birmingham, AL (US); Mikhail Mirov, Birmingham, AL (US); Igor Moskalev, Birmingham, AL (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 172 days.

(21) Appl. No.: 15/281,470

(22) Filed: Sep. 30, 2016

(65) Prior Publication Data
US 2017/0018903 A1 Jan. 19, 2017

Related U.S. Application Data

(63) Continuation of application No. PCT/US2015/023232, filed on Mar. 30, 2015.
(Continued)

(51) Int. Cl.
*H01S 3/109* (2006.01)
*H01S 3/11* (2006.01)
(Continued)

(52) U.S. Cl.
CPC ............ *H01S 3/1095* (2013.01); *H01S 3/109* (2013.01); *H01S 3/1112* (2013.01); *H01S 3/0813* (2013.01);
(Continued)

(58) Field of Classification Search
CPC ...... H01S 3/109; H01S 3/1112; H01S 3/1623; H01S 3/1095; H01S 3/1062;
(Continued)

(56) References Cited

U.S. PATENT DOCUMENTS 10,218,146 B2 * 2/2019 Sorokina ............... H01S 3/1095
2016/0268760 A1 * 9/2016 Sorokina ............... H01S 3/0811
(Continued)

*Primary Examiner* — M. A. Golub-Miller
(74) *Attorney, Agent, or Firm* — Yuri Kateshov, Esq.; Timothy J. King, Esq.; Caroline J. Roush, Esq.

(57) ABSTRACT

A Kerr Mode Locked ("KLM") laser is configured with a resonant cavity. The gain medium, selected from polycrystalline transition metal doped II-VI materials ("TM:II-VI), is cut at a normal angle of incidence and mounted in the resonant cavity so as to induce the KLM laser to emit a pulsed laser beam at a fundamental wavelength. The pulses of the emitted laser beam at the fundamental wavelength each vary within a 1.8-8 micron ("µm") wavelength range, have a pulse duration equal to or longer than 30-35 femtosecond ("fs") time range and an average output power within a mW to about 20 watts ("W") power range.

The disclosed resonant cavity is configured with a plurality of spaced apart reflectors, two of which flank and are spaced from the gain medium which is pumped to output a laser beam at a fundamental wavelength and its higher harmonic wavelengths. The gain medium is mounted on a translation mechanism operative to controllably displace the gain medium along a waist of the laser beam. The displacement of the gain medium causes redistribution of a laser power between a primary output at the fundamental wavelength and at least one secondary output at the higher harmonic wavelength.

14 Claims, 6 Drawing Sheets

Related U.S. Application Data (60) Provisional application No. 61/973,574, filed on Apr. 1, 2014, provisional application No. 61/973,616, filed on Apr. 1, 2014.

(51) Int. Cl.
  $H01S\ 3/16$ (2006.01)
  $H01S\ 3/094$ (2006.01)
  $H01S\ 3/081$ (2006.01)
  $H01S\ 3/106$ (2006.01)

(52) U.S. Cl.
  CPC ... *H01S 3/094038* (2013.01); *H01S 3/094042* (2013.01); *H01S 3/1062* (2013.01); *H01S 3/1623* (2013.01); *H01S 3/1628* (2013.01)

(58) Field of Classification Search
  CPC ............ H01S 3/0813; H01S 3/094038; H01S 3/1628; H01S 3/094042
  See application file for complete search history.

(56) References Cited

U.S. PATENT DOCUMENTS

| | | | |
|---|---|---|---|
| 2016/0294149 A1* | 10/2016 | Vasilyev | H01S 3/0612 |
| 2018/0113372 A1* | 4/2018 | Vasilyev | H01S 3/094076 |
| 2018/0278006 A1* | 9/2018 | Moskalev | H01S 3/0619 |
| 2019/0094564 A1* | 3/2019 | Rivera | G02B 27/48 |

\* cited by examiner

MID-IR KERR LENS MODE LOCKED LASER WITH NORMAL INCIDENCE MOUNTING OF POLYCRYSTALLINE TM:II-VI MATERIALS AND METHOD FOR CONTROLLING PARAMETERS OF POLYCRYSTALLINE TM:II-VI KERR LENS MODE LOCKED LASER

SUMMARY OF THE DISCLOSURE

Field of the Disclosure

This disclosure relates to mid-IR solid state self-starting Kerr lens mode-lock lasers. Particularly, the disclosure relates to a Kerr lens mode-lock laser operative to emit picosecond and femtosecond pulses over a 1.8-8 µm spectral range and configured with a normally cut gain medium which is selected from II-VI group of polycrystalline materials doped with transition metal ions.

Prior Art

Pulsed lasers are used for applications in various fields, such as optical signal processing, laser surgery, bio-medicine, optical diagnostics, two-photon microscopy, optical probing, optical reflectometry, material processing, etc. There are three main classes of pulsed lasers, namely Q-switched lasers, gain switched lasers, and mode-locked lasers with the latter being of a particular interest for this disclosure.

The mode-locked laser has multiple longitudinal modes that oscillate simultaneously with their respective phases locked to one another which allows generating of uniformly spaced short and ultra-short pulses. The fixed phase relationship is established by a mode-locking mechanism capable of synchronizing the phases of the lasing modes so that the phase differences among all lasing modes remain constant. These optically phase-locked modes then interfere with each other to form short optical pulses.

Kerr-lens method (Kerr-focusing, self-focusing), further referred to as Kerr-Lens Mode-locking (KLM), is one of the ultra-fast mode-locking mechanisms based on the phenomenon intrinsic to materials of groups II to VI and other optical materials, e.g. Ti—S) which are doped with transition metal ions. The KLM is a mechanism in which a pulse that builds up in a laser cavity containing a gain medium and a Kerr medium experiences not only self-phase modulation, but also self-focusing. While the KLM is not a saturable absorber, the non-linear optical properties such as the Kerr effect, give an artificial "saturable absorber" effect, which has a response time much faster than any intrinsic saturable absorber.

Typically, the gain medium used in the KLM-based lasers includes titanium sapphire Ti:S which has exceptionally good thermal-optical properties. As known, the simplicity and advantages of the resonator with Brewster mounted gain medium, such as Ti:S, greatly overweight the disadvantages associated with its mounting.

In contrast to the standard Ti:S single crystalline medium, transition metal (TM) doped II-VI materials in the form of single and particularly polycrystals offer unique opportunities for generation of ultra-short laser pulses in the mid-IR range (2-8 µm) which is complementary to Ti—S coverage (0.7-1.1 µm). Nonlimiting examples of suitable crystalline materials operating in a mid-IR wavelength range may include Zink Selenide ("ZnSe"), Zinc sulfide ("ZnS"), CdZnSe, CdZnTe and many others that demonstrate a bandwidth selectively covering the 1.8-8 micron spectral range.

Due to various reasons, those materials have poor thermal optical properties and feature a very strong non-uniformity of the thermal-optical effects when placed in Brewster configuration. As a result, the output power of the TM:II-VI lasers with Brewster mounting does not exceed a few Watts. Furthermore, the efficiency of such a laser is limited due to necessity to use relatively thin gain element with relatively low pump absorption.

Figure 1:
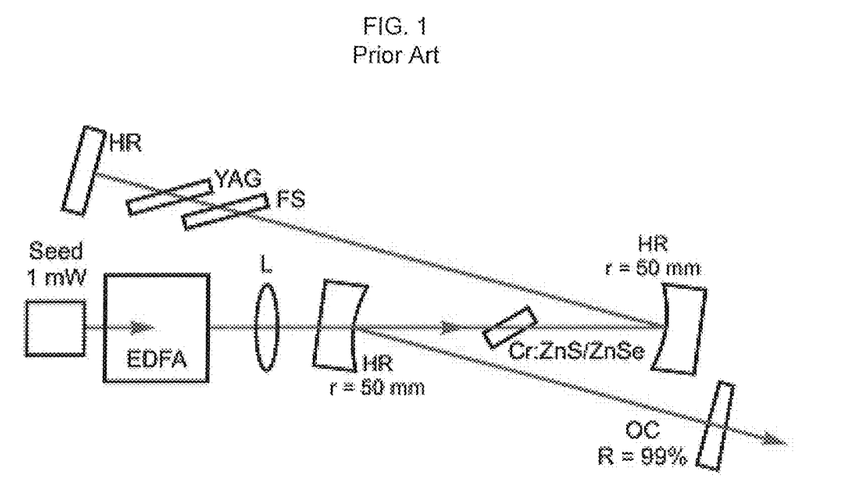
FIG. 1 is one exemplary schematic of the known prior art KLM laser.

FIG. 1 shows a working example of one of possible schematics of polycrystalline $Cr^{2+}$:ZnSe/ZnS KLM laser. The output of a linearly polarized Er-doped fiber amplifier (EDFA), seeded by a low noise 1550 nm narrowband semiconductor laser, is coupled to the standard astigmatism compensated asymmetric Z-folded resonator consisting of two curved high reflecting (HR) mirrors, plane HR mirror and plane output coupler (OC, R=99%). Astigmatism means that the beam foci for sagittal (the plane perpendicular to the main plain of the cavity) and tangential (i.e., parallel to the main plane) planes are not at the same position. Also, the stability regions of the cavity are different for different planes and the output is elliptical. These phenomena require compensation.

In the device of FIG. 1, the length of the laser cavity is about 94 cm. The KLM regime is obtained using two types of the laser (gain) medium: polycrystalline $Cr^{2+}$:ZnS (2.0 mm thick, 43% low-signal transmission at 1550 nm) and polycrystalline $Cr^{2+}$:ZnSe (2.4 mm thick, 15% transmission). Gain elements are plane-parallel polished, uncoated and Brewster mounted on a copper heat sink without forced cooling. In order for an optical cavity to sustain a pulse, the temporal shape and duration of the pulse must remain stable as it circulates through the cavity. As a result, the pulse is deformed, as it passes through them due to the wavelength dependence of the refractive index, and needs to be compensated. While the cavity mirrors used in the shown configuration are non-dispersive, the gain medium and other optional components are. The dispersion compensation is implemented using a combination of Brewster mounted fused silica plate (2 mm thick) and YAG plate (4 mm thick). The group delay dispersion of the resonator at 2400 nm, near the central laser wavelength, is about $-1000$ $fs^2$.

The laser is optimized for a maximum CW output power and then the distance between the curved mirrors is fine-adjusted in order to obtain a KLM regime. The mode-locked laser oscillation is initiated by the OC translation.

Multi-hour uninterrupted single-pulse oscillations are observed in $Cr^{2+}$:ZnSe at 1 W pump power and 60 mW laser output power. Further increase of the pump power results in multi-pulsing and frequent interruptions of the mode-lock. Maximum stability of $Cr^{2+}$:ZnS KLM laser is reached at 1.25 W pumping and 30 mW output power (1-2 hours of uninterrupted single-pulse oscillations).

Figure 2:
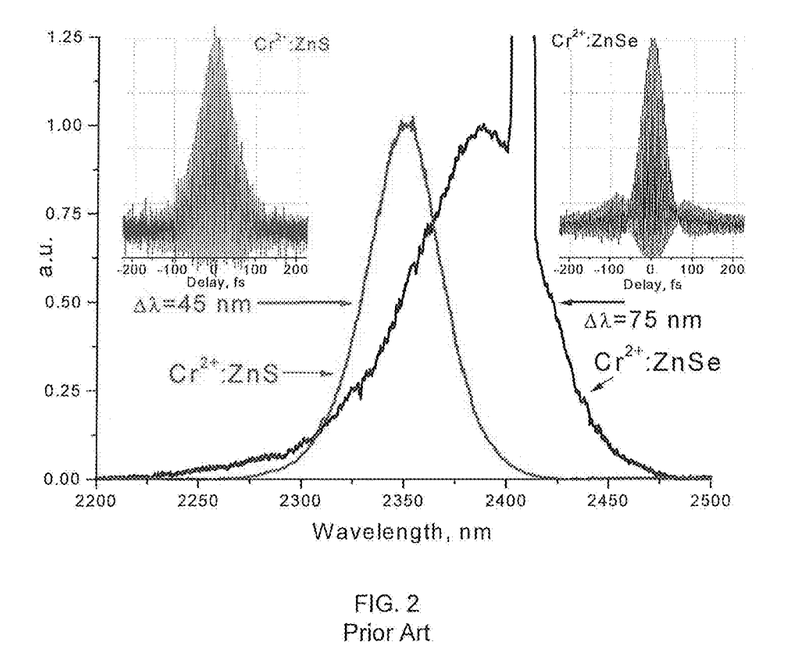
FIG. 2 is emission spectra and autocorrelation traces for the KLM laser of FIG. 1.

FIG. 2 compares the emission spectra and autocorrelation traces obtained for $Cr^{2+}$:ZnS and $Cr^{2+}$:ZnSe lasers in the KLM regime. The measurements were carried out for single pulse oscillations at 160 MHz pulse repetition rate. The output of $Cr^{2+}$:ZnS laser is $sech^2$ transform limited: 125 fs pulse duration was derived from the autocorrelation trace assuming $sech^2$ profile and 126 fs pulse duration was calculated from the emission spectrum assuming $\Delta\tau\Delta\nu=0.315$ time-bandwidth product. On the other hand, the shape of the autocorrelation trace for $Cr^{2+}$:ZnSe laser reveals chirped pulses. Emission spectrum of the laser is distorted and, hence, the time-bandwidth product is increased. Roughly, the pulse duration of $Cr^{2+}$:ZnSe laser is estimated to be within a 100-130 fs range.

Figures 3, 3A:
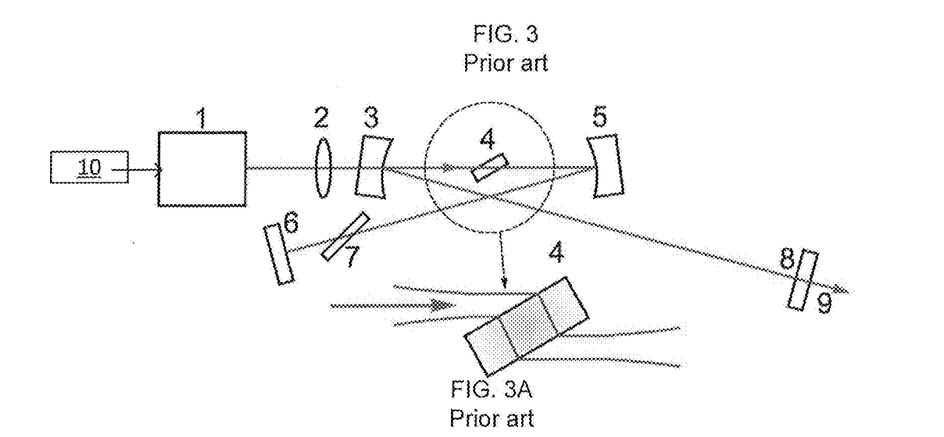
FIG. 3 is another exemplary schematic of the known art KLM laser.
FIG. 3A is the enlarged detail of FIG. 3 illustrating beam propagation in a Brewster mounted gain medium.

FIG. 3 illustrates a rather simplified cavity design of the known KLM laser. Specifically, an optical pump source 1, pumped by a seed laser 10, emits the pump beam (shown in green) which is focused and shaped while propagating through a system of pump beam focusing and shaping optics 2, which may include lenses or mirrors. The focused and shaped beam is then coupled into the optical cavity through a folded concave dielectric coated mirror 3 with high reflectivity at a laser wavelength and high transmission at a pump wavelength. After propagating further through a gain medium 4, a laser beam (shown in red) at the desired wavelength impinges on a folded concave dielectric coated mirror 5 with high reflectivity at the laser wavelength and optional high transmission at the pump wavelength. Reflected from mirror 5, the laser beam is incident on a plane mirror 6 with high reflectivity at the laser wavelength which is dielectric or metal coated. Optionally, a dispersion compensation component 7, such as a plane parallel plate mounted in the laser resonator at Brewster's angle, is located in the cavity arm between mirrors 5 and 6. After retroreflection from mirror 6, the laser beam is incident on mirror 5 and propagates through gain medium 4 to impinge on mirror 3. Finally, the laser beam decouples from the cavity through an output coupler ("OC") 8 as an output beam 9. Path of the laser beam is shown in red while the pump beam is in green.

The Brewster mounting of the gain medium, as shown in FIGS. 1 and 3, is overwhelmingly used in the KLM lasers due to its several advantages. First, at the Brewster's angle of incidence, light with a particular p-polarization is perfectly transmitted through a surface with no reflection which thus makes special and expensive antireflection coatings unnecessary. Second, the gain medium functions as a polarizer which makes the use of additional polarizers unnecessary. Third, the Brewster mounting of the gain element and special choice of the resonator's parameters allows compensating the astigmatism of the laser beam, which propagates within the resonator, and of the output laser beam (astigmatism is caused by non-normal incidence of light on curved mirror surfaces). The astigmatism of the resonator may reduce performance of the laser (e.g. the quality of the output laser beam). In some delicate situations, such as Kerr-lens mode locking, the astigmatism may even impede the proper laser operation.

The Brewster mounting of the gain medium is not, however, without disadvantages. As illustrated in FIG. 3A, the Brewster mounting scheme includes strong non-uniformity of the laser and pump beams inside the gain element. The optical beam is being expanded in one direction and keeps the original size in a perpendicular direction. The beam expansion factor inside the Brewster mounted optical material equals the refraction index of the material n. Thus, the Brewster mounting (i) results in decrease of the optical intensity inside the gain element by a factor of n, and (ii) in the asymmetry of the pump and laser beams results in non-uniform heat release inside the pumped channel and hence in non-uniformity of various thermal-optical effects in the material.

The disadvantages of the Brewster mounting limit the output power to about 1 W in the single crystalline TM:II-VI materials. The KLM laser operation with the output power of 30-60 mW has been recently demonstrated in polycrystalline material, but clearly needs to be increased to meet the needs required by many industrial and scientific applications. However, further power scaling of KLM TM:II-VI lasers with a conventional scheme of the resonator represents a challenging problem. In addition, the above-disclosed disadvantages prevent shortening the pulse duration, Yet again, many applications require pulses shorter than those currently available with the currently reported record short pulse of about 40 femtosecond in the desired range of frequencies.

In principle, the optical density of Brewster mounted gain medium limits a pump power and therefore the output power. As the thickness of the gain medium increases, which allows the use of higher pump powers, so does the degree of astigmatism which necessarily should be compensated. Otherwise, as mentioned above, the KLM-based lasers are highly sensitive to the astigmatism phenomenon and, in the worst possible scenario, may stop properly operating. However such compensation is neither easy nor particularly effective.

A need, therefore, exists for a high power mid-IR solid state self-starting Kerr lens mode-locked laser with an optical cavity which includes a polycrystalline nonlinear material selected from transition metal (TM) doped II-VI materials and mounted at a normal angle in the resonator cavity so as to significantly improve of the laser output power, efficiency and pulse duration in the KLM regime.

A further need, thus, exists for the above disclosed mid-IR KLM lasers which has a configuration capable of operating at high pump powers so as to output high power ultra-short pulses of up to several tens of watts.

SUMMARY OF THE INVENTION

The above articulated needs are satisfied by the disclosed Kerr lens mode locked laser configured with a gain medium, such as TM doped II-VI materials, which is mounted in the optical cavity at normal incidence to a pump beam. The normal incidence mounting has the following important features and advantages:

The laser and pump beams remain circular throughout the gain medium;

The heat release inside the pumped channel and, hence, various thermal-optical effects in the material are uniform and axially symmetric;

The optical intensity inside the gain element is increased by a factor of n (if compared with conventional Brewster mounting scheme);

Various nonlinear optical effects inside the gain element are increased due to higher optical intensity;

More pronounced nonlinear effects are of importance in KLM laser regime as the Kerr effect has nonlinear nature;

More pronounced nonlinear Kerr effect in TM:II-VI medium may allow for the compensation (at least partial) of the astigmatism of the resonator. Thus, the use of TM:II-VI gain elements at normal incidence allow relaxing (to some extent) the requirements to the compensation of astigmatism in the resonator of KLM laser.

Normal incidence mounting greatly simplifies the use of the gain elements with large length and hence high pump absorption;

High pump absorption and high optical intensity result in more efficient laser interaction and hence enable flexibility in the selection of the output coupler parameters to allow for increased laser output powers (at a given pump power);

Uniform thermal-optical effects in the material enable the increase of the pump power (if compared with conventional Brewster mounting scheme) and, hence, allow for further scaling up the laser output power.

All of the above are of special importance for TM:II-VI laser medium due to a relatively poor thermal optical properties of these materials and to TM:II-VI-based lasers operating in KLM regime.

The inventive concept is realized in two embodiments. Each of the embodiments includes a few aspects as briefly disclosed immediately below.

In accordance with the first aspect of the first embodiment, the inventive Kerr Mode Locked ("KLM") laser is configured with a resonant cavity, and a gain medium selected from polycrystalline transition metal doped II-VI materials ("TM:II-VI), These materials may include Zink Selenide ("ZnSe"), Zinc sulfide ("ZnS"), CdZnSe, CdZnTe and many others that demonstrate a bandwidth selectively covering the 1.8-8 micron spectral range. The gain medium is mounted at a normal angle of incidence in the resonant cavity so as to induce Kerr-lens mode locking sufficient for the resonant cavity to emit a pulsed laser beam at a fundamental wavelength in the 1.8-8 μm range. The pulses of the emitted laser beam at the fundamental wavelength have a pulse duration equal to or longer than 30-35 femtosecond ("fs") time range and an average output power within a mW to about 20 watts ("W") power range.

In accordance with the second aspect, the KLM laser of the first aspect is configured with the gain medium having a phase-matching bandwidth broad enough to provide for emitting the output laser beam at half the fundamental wavelength (SHG) within the entire fundamental wavelength range.

In accordance with the third aspect, the inventive KLM laser of the first and/or second aspects has the gain medium configured with the phase-matching bandwidth which is sufficiently broad to generate second, third and fourth harmonics waves of the fundamental wavelength simultaneously as the pump beam propagates through the gain medium.

In accordance with the fourth aspect, any combination of first, second and third aspects or of each of these individually, the inventive KLM laser further includes a planar resonant cavity.

In accordance with the fifth aspect of the disclosure, any combination of first, second, third and fourth aspects or of any of these individually, the gain medium includes TM doped binary and ternary II-VI materials.

In accordance with the sixth aspect of the disclosure, the inventive KLM laser of each of the above five aspects or any combination of these aspects, the gain medium is selected from the group consisting of Cr2+:ZnSe, Cr2+:ZnS, Cr2+:CdSe, Cr2+:CdS, Cr2+:ZnTe, Cr2+:CdMnTe, Cr2+:CdZnTe, Cr2+:ZnSSe, Fe2+:ZnSe, Fe2+:ZnS, Fe2+:CdSe, Fe2+:CdS, Fe2+:ZnTe, Fe2+:CdMnTe, Fe2+:CdZnTe, and Fe2+:ZnSSe and a combination of these.

In accordance with the seventh aspect of the disclosure, the inventive The KLM of each of the previously disclosed aspects or any combination of these includes a linearly polarized fiber laser pump source. The latter is selected from an erbium or thulium doped single mode fiber and operative to emit a pump beam which is coupled into the gain medium at a pump wavelength different from the fundamental wavelength. The laser and pump beams remain circular while propagating through the gain medium.

In the eighth aspect, the disclosed laser KLM laser of each of first through seventh or any combinations of these aspects includes the gain medium configured to uniformly release heat in response to the coupled pump beam. The latter generates uniform, axially symmetric thermal-optical effects inside the pumped gain medium.

In accordance with the ninth aspect of the disclosure, the inventive KLM of each of the previously eight aspects or any combination of these aspects includes the gain medium with the bandwidth. The bandwidth is sufficiently broad for generating the output laser beam at a sum of the pump and fundamental wavelengths and/or a difference therebetween, and/or a sum of fundamental and second, third and/or fourth optical harmonics of the fundamental frequency.

In the tenth aspect of the disclosure, the inventive KLM, as disclosed in each of 1 through 9 aspects or any combination of these aspects, is configured with the gain medium having the inside optical intensity increased by a factor of n if compared with a conventional Brewster mounting scheme.

In the eleventh aspect of the disclosure, the inventive KLM, as disclosed in each of 1 through 10 aspects or any combination of these, the gain medium is configured to substantially compensate for astigmatism of the resonant cavity.

According to the twelfth aspect, the KLM as disclosed in any of aspects is configured with a resonant cavity defined by at least two adjacent upstream and downstream dielectrically coated folded mirrors which are spaced from one another along a path of the pump beam and flank the gain medium. Each mirror is configured with a high reflectivity at the fundamental wavelength and high transmission at the pump wavelength, with the downstream folded mirror being configured to at least partially transmit the high harmonic wave.

According to the thirteenth aspect of the disclosure, the KLM laser, as disclosed in each of the previously disclosed aspects or any combination of these aspects, has the resonant cavity. including a partially transmitting at the fundamental wavelength output coupler, and at least one plane dichroic mirror upstream from the output coupler. The cavity further has at least one intermediary plate with high transmission at the fundamental and high harmonic waves.

In the fourteenth aspect of the disclosure, the KLM of each of the previous aspects or any combination of these is formed with the resonant cavity which includes a dispersion compensation element configured as a plane parallel plate or prism and operative to limit a dispersion. The compensation element is mounted at a Brewster angle.

In the fifteens aspect of the disclosure, the KLM of each of the previous aspects or any combination of these is formed with the resonant cavity which includes a Brewster mounted birefringent tuner.

In the sixteenth aspect of the disclosure, the KLM of each of the previous aspects or any combination of these further includes a translation stage displacing the gain medium within the resonant cavity along a waist of the laser beam. The displacement of the gain medium is controlled to redistribute the average power of the laser beam among a primary output of the emitted laser beam at the fundamental wavelength and secondary outputs at respective second, third and fourth harmonic waves.

In accordance with second embodiment of the disclosure, its first aspect describes a method for nonlinear frequency conversion of femtosecond laser emission in the Kerr lens-mode ("KLM") locked laser, as disclosed in any of or any combination of all previous aspects of the first embodiment. The method provides for a multi-pass resonant cavity and includes mounting a gain medium which is selected from transition metal doped II-VI ("TM:II-VI") materials. The latter are cut at a normal incidence angle within the resonant cavity. The Kerr-lens mode locks the resonant cavity so as to emit a primary output of the laser emission including a train of output pulses at a fundamental wavelength. The pulses each vary within a 1.8-8 micron ("μm") wavelength range, have a pulse duration equal to or longer than 30-35 femtosecond ("fs") time range and an average output power within a mW to about 20 watts ("W") power range.

In the second aspect of the method, the resonant cavity is further provided with a secondary output simultaneously with the primary output. The secondary output is at a half-wavelength of the fundamental wavelength.

In the third aspect of the second embodiment, the method of first and/or second aspects provides additional outputs of the laser beam at third and fourth harmonics of the fundamental wavelength simultaneously with the primary and secondary outputs.

In the fourth aspect of second embodiment, the method of any of the previous aspects or any combination thereof includes generating a pump beam at a pump wavelength different from the fundamental wavelength, and coupling the pump beam into the gain medium.

According to the fifth aspect of the second embodiment the method of each of the previously disclosed aspects or any combination provides for additional outputs of the laser beam at a sum of the pump and fundamental wavelengths and a difference therebetween, and a sum of fundamental and second, third and fourth optical harmonic wavelengths and a difference thereof.

BRIEF DESCRIPTION OF THE DRAWINGS

The above and other aspects, features and advantages of the disclosure will become more readily apparent from the following drawings, in which.

SPECIFIC DESCRIPTION

Reference will now be made in detail to embodiments of the invention. Wherever possible, same or similar numerals are used in the drawings and the description to refer to the same or like parts or steps common to the prior art and inventive configurations. The drawings are in simplified form and are not to precise scale. Unless specifically noted, it is intended that the words and phrases in the specification and claims be given the ordinary and accustomed meaning to those of ordinary skill in the diode and liber laser arts. The word "couple" and similar terms do not necessarily denote direct and immediate connections, but also include mechanical and optical connections through free space or intermediate elements.

Figures 4, 4A, 4B:
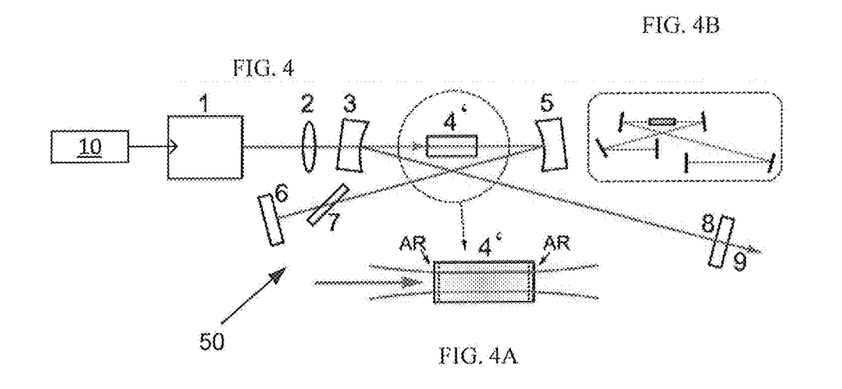
FIG. 4 is an optical schematic of one design of the inventive KLM resonator.
FIG. 4A is the enlarged gain medium of FIG. 2.
FIG. 4B is one of possible schematics of the disclosed KLM laser of FIG. 4.

FIG. 4 illustrates the exemplary configuration of the disclosed KLM laser 50 having gain medium 4' mounted at normal incidence to the plane of beam propagation in the shown resonator. The remaining components are similar to those of FIG. 3 and include optical pump source 1 seeded by source 10 and emitting a pump beam (shown in green). The pump source 1 may be configured as a standard linearly polarized single transverse mode ("SM") Er-doped fiber laser (EDFL). Alternatively, source 10 may be based on a thulium ("Tm")-doped SM fiber laser.

The normal incidence mounting of gain medium 4' is critical to achieving higher output laser powers and efficiency. In particular, polycrystalline antireflection coated gain element 4' is coupled between folded concave dielectric-coated mirrors 3 and 5. While gain element 4' is shown to be plane parallel, it can also be wedged. The mirror 3 is highly reflective at the laser wavelength and highly transmissive at the pump wavelength, whereas mirror 5 is configured with high reflectivity at the laser wavelength and optional high transmission at the pump wavelength. The resonator may have a variety of configurations. For example, FIG. 4B illustrates the resonator with more than two folding mirrors as shown. Regardless of the resonator configuration, eventually the laser beam impinges on output coupler ("OC") 8 and is coupled out of the resonator as output beam 9 at the laser wavelength.

It should be mentioned that the dispersion compensation can be implemented using specially optimized "dispersive" mirrors. A highly reflective mirror may be a viable alternative to output coupler 8. The resonator may include additional components for the laser wavelength tuning.

Unlike the conventional resonator of the KLM laser of FIGS. 1 and 3, the inventive planar resonator has astigmatism. However, in a particular situation of TM:II-VI laser materials, the high uniformity of the pump and laser beams inside the gain element, as shown in FIG. 4B, allow the gain element to substantially compensate for astigmatism of the resonant cavity. The principle experiment, which is described below, confirms that statement. Furthermore, the astigmatism of the disclosed planar resonator can be kept even lower by careful choice of the radii of curvature of the folded concave mirrors and of the folding angles. If necessary, there are also a number of techniques for astigmatism compensation in a folded resonator without a Brewster optical element well known to one of ordinary skill in the laser arts, but all of them are simply optional and not necessary as in the known prior art devices.

Accordingly, a well-pronounced nonlinear Kerr effect in TM:II-VI medium may allow for a significant compensation of the astigmatism of the resonator. Thus, the use of TM:II-VI gain elements at normal incidence allows for somewhat relaxed requirements to the compensation of astigmatism in the resonator of KLM laser 50.

Main advantages of the normal incidence mounting of the gain element are (i) better management of the thermal optical effects in the gain element due to circularity of the pump and laser beams, (ii) significant increase of pump and laser intensity inside the gain element (if compared with the standard Brewster mounting), (iii) greater simplicity of use of the gain elements with large length and volume and hence high pump absorption. The normal incidence mounting could be also more favorable for Kerr-lens mode-locking.

Figures 5, 5A, 5B:
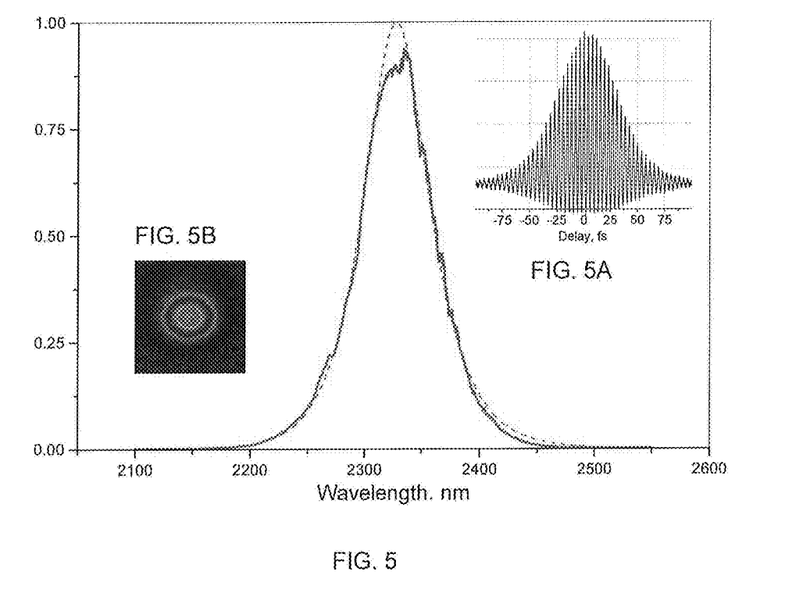
FIG. 5 is a measured laser emission spectrum of the disclosed KLM laser fitted with a theoretical curve for transform limited laser emission spectrum.
FIG. 5A is an autocorrelation trace.
FIG. 5B is the image of the output laser beam emitted by the disclosed KLM laser.

FIGS. 5-5B illustrate the results of KLM laser planar resonator 50 of FIG. 4 configured with standard mass-produced AR coated polycrystalline Cr:ZnS gain element 4. The KLM regime of the laser has been easily obtained. The KLM regime of the laser was confirmed by measurement of the laser emission spectrum of FIG. 5 and of the nonlinear autocorrelation function of FIG. 5A, as discussed herein below. The Fourier transform limited pulses with 84 fs pulse duration were confirmed by mathematical analysis of the experimental data, also discussed herein below. The transform-limited pulse is a theoretically shortest possible pulse determined as $\Delta t \Delta \omega = \frac{1}{2}$, where t is a pulse duration and $\Delta t \Delta \omega$–spectral width. As can be seen from the above, in order to generate the shortest possible light pulsed with a specific duration, a broad spectral bandwidth is required. As can be seen, the tested KLM TM:II-VI laser 50 was operative to output beam 9 at the fundamental/laser wavelength with an output power of about 1.3 W at 93 MHz repletion rate and pulse energy 14 nJ and featured transformed limited pulses and good beam quality, as shown in FIG. 5B. The obtained output power is believed to be uniquely high.

Figure 6:
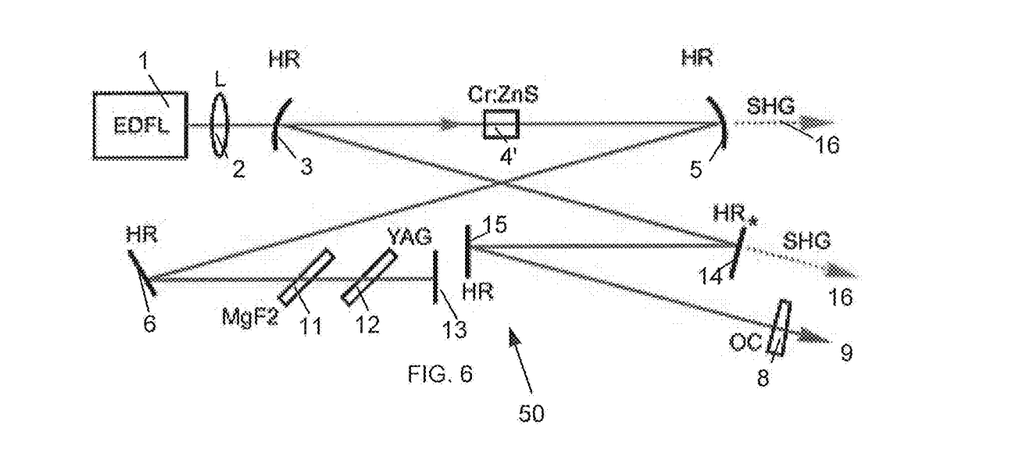
FIG. 6 is an optical schematic of the optimized inventive KLM laser.

FIG. 6 illustrates inventive KLM laser 50 based on $Cr^{2+}$:ZnS gain element 4 and having the optimized resonator. HR—dispersive high reflectors (GDD~–200 $fs^2$), YAG—2 mm thick Brewster mounted dispersion compensation plate, OC—output coupler (|GDD|<150 $fs^2$), $MgF_2$—optional 0.5 mm thick Brewster mounted birefringent tuner (Lyot filter), L—pump focusing lens. SHG—secondary outputs of the laser at second harmonic wavelength. The laser is pumped at 1567 nm by a linearly polarized radiation of Er-doped fiber laser (EDFL).

The pump source 1 includes a standard linearly polarized Er-doped fiber laser (EDFL). In order to increase the laser output power, a 5 mm long polycrystalline $Cr^{2+}$:ZnS gain element 4' with 11% low-signal transmission at 1567 nm pump wavelength is inserted between AR coated folded mirrors 3 and 5 at normal incidence on a water cooled copper heat sink. The lengths of the cavity legs were unequal with 3 to 5 ratio. Overall dispersion of the resonator at the maximum of laser emission (2300-2400 nm) was about 1400-1600 $fs^2$. For the experiments on wavelength tuning of the KLM laser a 0.5 mm thick Brewster-mounted birefringent tuner 11 (single-plate Lyot filter) made of $MgF_2$ was used. Additionally, a 2 mm thick Brewster mounted YAG plate 12 was placed next to tuner 11 in the leg defined between mirrors 6 and 13. The planar resonator further includes an additional leg defined between plain mirrors 15 and 14 immediately upstream from OC 8. Dispersion of the OCs is within ±150 $fs^2$ in 2200-2400 nm range. The outputs 16 at SHG are shown in blue, pump beam is in green, and laser beam is shown in red.

The KLM regime of the laser with the optimized planar resonator has been obtained using the output couplers with 96, 90, 70, and 50% reflectivity. Most measurements were carried out at the pulse repetition rate of 94.5 MHz. However, KLM laser oscillations were obtained in a range of the pulse repetition rates (80-120 MHz). Results of the laser characterization are summarized in the following table.

TABLE

| $R_{OC}$ | $P_{out}$ | τ, fs | Δλ | $λ_C$ | $P_{pump}$ |
|---|---|---|---|---|---|
| 96 | 0.3 | 85 | 70 | 2380 | 3.4 |
| 90 | 0.6 | 46 | 120 | 2300 | 5.2 |
| 70 | 1.2 | 68 | 84 | 2332 | 6.7 |
| 50 | 2.0 | 67 | 82 | 2295 | 10.0 |

Figure 7:
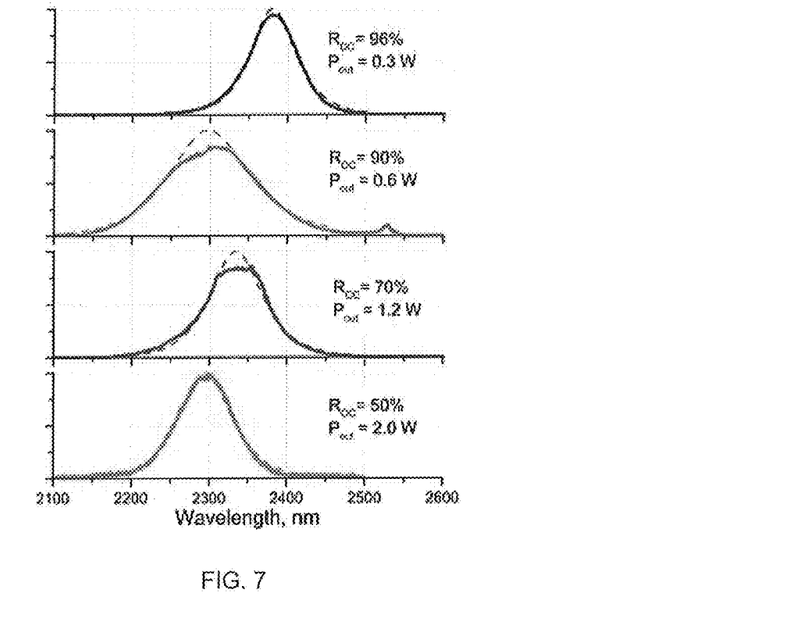
FIG. 7 illustrates measured emission spectra of the disclosed KLM laser of FIG. 6 configured with the laser's output coupler having respective different reflectivity.
Figure 8:
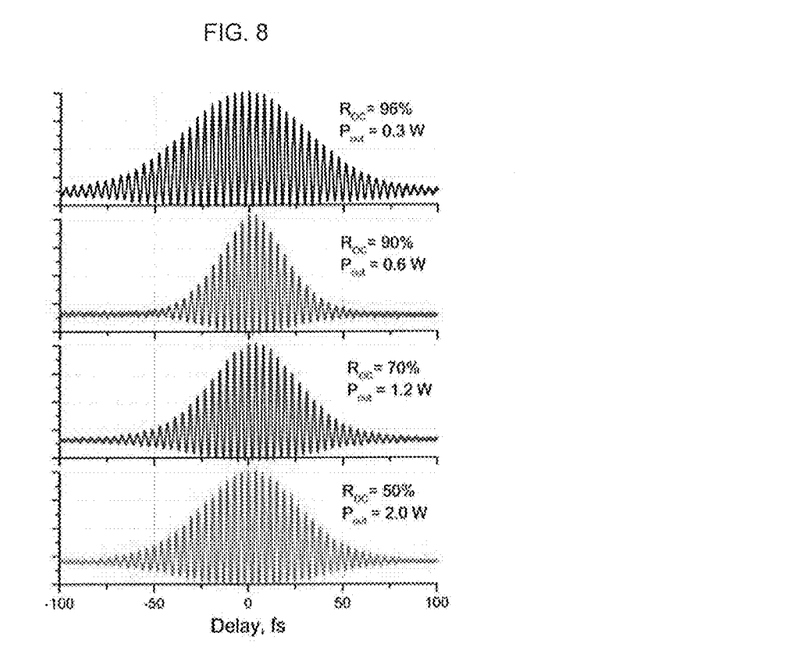
FIG. 8 illustrates autocorrelation traces of the KLM laser of FIG. 6 corresponding to respective emission spectra of FIG. 7.

$R_{OC}$ - reflectivity of the output coupler,
$P_{out}$ - average output laser power in KLM regime,
τ - laser pulse duration (FWHM),
Δλ - width of the laser emission spectrum (FWHM),
$λ_C$ - laser emission peak,
$P_{pump}$ - optimal pump power Emission spectra and autocorrelation traces of KLM laser 50 of FIG. 6 obtained for the OCs with different reflectivity are illustrated in FIGS. 7 and 8, respectively. The shape of the spectra and of the autocorrelation functions correspond to $sech^2$ pulses for all four types of the OC. This allows the use of the time bandwidth product of 0.315 for estimation of the pulse duration. The small peak in the spectrum measured at $R_{OC}$=90% (2525 nm) indicates a presence of Kelly sidebands in the laser emission. The opposite sideband is suppressed due to a leakage through high reflectors at the wavelengths below 2200 nm. The flat-top spectra measured at $R_{OC}$=90 and 70% for the case when a second harmonic generation (SHG) was directly obtained in polycrystalline $Cr^{2+}$:ZnS are explained below.

Summarizing the above disclosed configurations of KLM laser 50 based on normally mounted polycrystalline II-VI materials and particularly polycrystalline $Cr^{2+}$:ZnS laser, stable single-pulse fs laser oscillations are routinely obtained in a range of the pulse repetition rates 80-120 MHz with output power of fs laser of about 2 W, and shortest pulse duration about 46 fs. All of the above data is believed unprecedented for the II-VI gain medium. Furthermore, at several occasions, KLM laser 50 was operative to generate even more unique data with the output power of up to 20 W and the pulse duration as low as 30-35 picoseconds.

The practical applications of femtosecond lasers often require the nonlinear frequency conversion (e.g. optical harmonic generation, sum and difference frequency generation, and optical parametric generation. For instance, the 1.1-1.5 μm spectral range, which is of importance for multi-photon imaging, can be addressed using Ti:S fs laser combined with the optical parametric generator. The same spectral range can be addressed using SHG of TM:II-VI mid-IR fs laser operating in 2.2-3.0 μm spectral range.

Efficiency of SHG in nonlinear materials is limited by dispersion (a difference in velocity of light propagation at a fundamental laser wavelength and half the fundamental ("SH") wavelengths. Therefore, the energy transfer from the fundamental wavelength to the SH wavelength occurs at a limited length of the nonlinear material, so called coherence length ("CL"). In most materials CL is of the order of few tens of μm resulting in weak SH generation efficiency. A number of techniques to overcome this limit have been developed during past decades. Traditional techniques are based on birefringence of some nonlinear crystals. More recent developments are based on engineering of the microscopic structure of the nonlinear material (quasi phase matching or QPM). Standard QPM crystals contain regular patterns, optimized for the most efficient nonlinear frequency conversion at the desired laser wavelength, e.g. they have limited bandwidth of the nonlinear frequency conversion. More sophisticated patterning allows for an increase of the bandwidth, which is accompanied by a decrease of the overall conversion efficiency.

Polycrystalline TM:II-VI materials used here consist of microscopic single-crystal grains. The polycrystalline TM:II-VI samples used in the experiments have a grain size of the order of the coherence length of SHG process in middle IR wavelength range (3-6 μm, depending on the wavelength and type of the material). Thus polycrystalline TM:II-VI materials can be patterned like standard QPM material. Unlike in the standard QPM material, the patterning is not perfect but randomized (there are dissimilarities in the grain size and in orientation of the crystallographic axes). This randomization of the patterning results in low nonlinear gain (if compared with standard QPM material). However the randomization allows for SHG in very broad spectral range. Thus, polycrystalline TM:II-VI materials have very large bandwidth of the nonlinear frequency conversion. Efficiency of the nonlinear frequency conversion strongly depends from the optical intensity (for instance, SHG efficiency is proportional to squared optical intensity). Therefore, relatively low nonlinear gain of polycrystalline TM:II-VI material can be compensated by a very high intensity of fs laser pulses. Described properties of polycrystalline TM:II-VI materials are of importance for nonlinear frequency conversion of fs laser emission.

Figure 9:
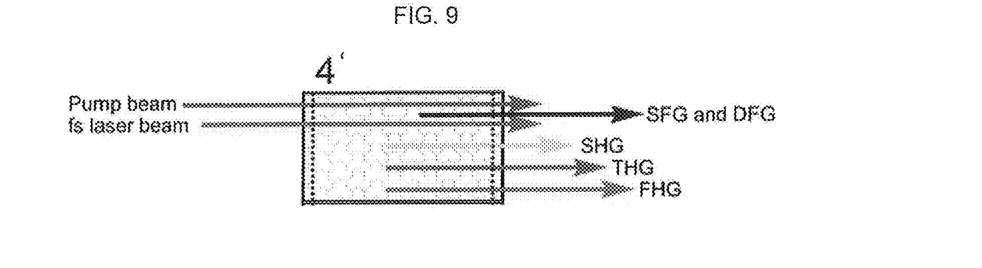
FIG. 9 is an enlarged view of the polycrystalline transition metal ("TM") TM:II-IV gain medium of the disclosed KLM laser.
Figure 10:
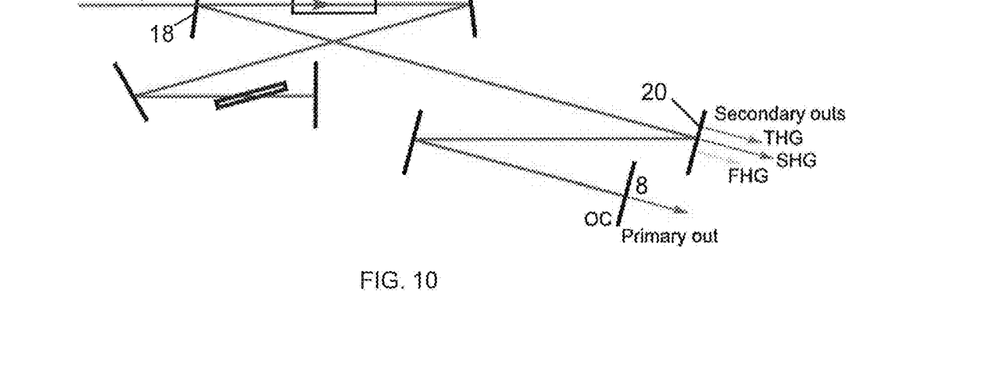
FIG. 10 is still another optical schematic of the inventive KLM laser.

Referring specifically to FIGS. 9 and 10, KLM laser 50 is configured with polycrystalline TM:II-VI gain medium 4'. The disclosed configuration of FIG. 10 is operative to simultaneously output the beams at respective second, third and fourth harmonic generation wavelengths shown respectively in yellow (SHG), green (THG) and blue (FHG) in FIG. 9, as well as sum- and difference-frequency wavelengths both shown in black (SFG and DFG).

Figure 11A:
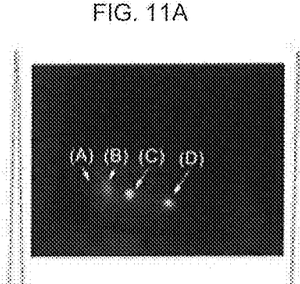
FIG. 11A are four images of the laser's output beam at respective fundamental, second, third and fourth harmonic wavelengths.
Figure 11B:
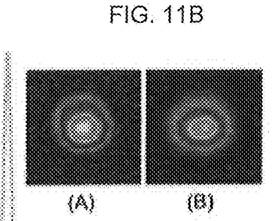
FIG. 11B are spatial profiles of the output of the inventive KLM laser at a fundamental wavelength and second harmonic acquired by a pyrocamera.
Figure 11C:
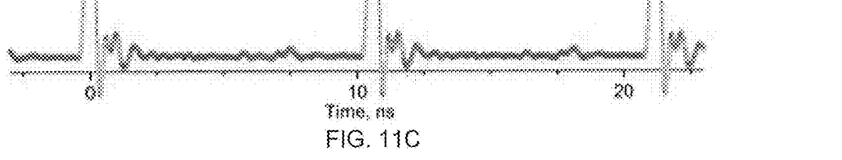
FIG. 11C is a waveform of the KLM laser pulse train acquired at the second harmonic wavelength.

The laser output at a fundamental wavelength is implemented via partially transmitting OC 8. The laser outputs at respective second, third, and forth harmonics leave the resonator via mirror 20 after reflection at mirror 18. It is important to point out that all of the resonator's mirrors do not have to be specially designed to generate a high harmonic output. In the tested device, the mirrors transmission in SHG wavelengths range is about 50% and oscillates as a function of the wavelength. FIG. 11A illustrates snapshot of typical images of the outputs of 2 W KLM laser 50 at respective fundamental (A), second (B), third (C) and forth (D) harmonic wavelengths (2300, 1150, 770, 575 nm respectively) obtained by an IR sensitive card after placed behind mirror 20. FIG. 11B illustrates two images of the output beam at the fundamental frequency and second harmonic measured by pyrocamera placed behind the OC 8. FIG. 11C illustrates a graph related to a waveform of the KLM laser pulse train which is acquired at the SHG wavelength. Thus, a considerable fraction (up to 50%) of the mid-IR femtosecond laser emission is converted to the second harmonic and the amount of the SH power can be adjusted by control of the OC reflectivity.

The output power of fs laser 50 of FIG. 10 at SHG wavelength was 30 mW after mirror 20. That allows obtaining 240 mW SHG power inside the resonator (one has to take into account 50% transmission of the mirrors 18, 20 and the fact that SHG occurs in two opposite directions). The obtained results reveal the following properties of polycrystalline TM:II-VI materials: Polycrystalline TM:II-VI materials are rather efficient nonlinear frequency converters of mid-IR fs pulses (e.g. approximately the same optical power at fundamental and at SHG wavelengths has been obtained during the proof-of-principle experiment). The phase-matching bandwidth of polycrystalline TM:II-VI materials is broad enough to allow for SHG of the whole fs laser emission spectrum. The phase-matching bandwidth of polycrystalline TM:II-VI materials is broad enough to allow for simultaneous SHG, THG, and FHG. Polycrystalline TM:II-VI materials inside the disclosed planar resonator can function as the fs laser gain medium as well as the nonlinear frequency converter. Thus the laser 50 may output multiple fs outputs at four different wavelengths due to the polycrystalline structure of gain medium 4' when the sizes of the microscopic single-crystal grains are of the order of the coherence length of SHG, THG and FHG processes.

Dissimilarities in the grain size and in orientation of the crystallographic axes result in the 'patterning' of the material, like in quasi phase matched (QPM) nonlinear converters. Unlike in the standard QPM material, the patterning is not regular but random. On the one hand, the nonlinear gain in randomly patterned material is very low. On the other hand, random patterning results in very large bandwidth of the nonlinear frequency conversion. Accordingly, low nonlinear gain of polycrystalline $Cr^{2+}$:ZnS is compensated by a high peak intensity of fs laser pulses inside the resonator. In summary, the use of polycrystalline TM:II-VI materials with randomized QPM has following important features:

(i) The use of polycrystalline TM:II-VI materials allows for nonlinear frequency conversion of the whole emission spectrum of the fs laser due to very large nonlinear bandwidth of the medium.

(ii) The nonlinear frequency conversion in polycrystalline TM:II-VI materials may include SHG, sum frequency mixing between the laser emission at fundamental wavelength and its optical harmonics, sum and difference frequency mixing between the fs laser and other laser source (e.g. the pump laser), etc.

(iii) Mounting of the polycrystalline TM:II-VI material at normal incidence allows to reduce the laser beam size inside the medium and, hence, increase the optical intensity and, hence, significantly increase the nonlinear conversion efficiency.

(iv) Mounting of the polycrystalline TM:II-VI material inside the planar resonator of the fs laser allows for simultaneous generation of fs laser pulses at fundamental laser wavelength and at a number of secondary wavelengths (SHG, THG, FHG, SFG, DFG, etc.)

(v) Mounting of the polycrystalline TM:II-VI medium at normal incidence inside the planar resonator of the KLM laser allows to increase the length of the gain element and, hence, increase the length of nonlinear interaction and, hence, further significantly increase the nonlinear conversion efficiency.

(vi) Mounting of the polycrystalline TM:II-VI material inside the planar resonator of the KLM laser allows for precise control of fs laser parameters via the interplay between the Kerr nonlinearity and other nonlinearities in the material, as will be described below.

(vii) Mounting of the polycrystalline TM:II-VI material inside the planar resonator of the KLM laser allows to maximize the nonlinear conversion efficiency as the optical power, which circulates inside the resonator, is always higher than the optical power outside the resonator. Furthermore, the optical power inside the planar resonator (and hence, the intensity of the laser beam in polycrystalline TM:II-VI material) can be precisely controlled by optimization of the reflectivity of the output coupler.

(viii) The secondary output of polycrystalline TM:II-VI fs laser at SHG, THG, FHG, SFG, DFG wavelengths can be implemented via specially designed dichroic mirror with high reflectivity HR at fundamental laser wavelength and high transmission HT at secondary wavelengths.

(ix) The secondary output of polycrystalline TM:II-VI fs laser at SHG, THG, FHG, SFG, DFG wavelengths can be implemented via specially designed dielectric coated plates with HT at fundamental laser wavelength and HR at secondary wavelengths. The plates can be mounted e.g. between the polycrystalline TM:II-VI optical element and the resonator mirrors.

Figures 12, 12A:
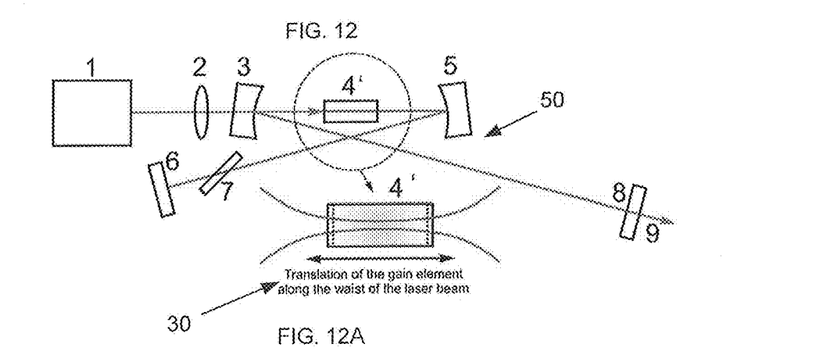
FIG. 12 is a further optical schematic of the inventive KLM laser provided with a means for controlling laser's parameters.
FIG. 12A is the enlarged view of the gain medium of FIG. 12.

FIGS. 12 and 12A illustrate a schematic for controlling the parameters of polycrystalline TM:II-VI Kerr lens mode locked laser 50. Similar to the schematic of FIG. 4, the illustrated schematic is configured with optical pump source 1, pump beam focusing and shaping optics 2, folded concave dielectric coated mirror with high reflectivity at the laser wavelength and high transmission at pump wavelength 3, antireflection (AR) coated polycrystalline TM:II-VI gain element 4' mounted at normal incidence. The gain element 4' is mounted on a stage 30 of FIG. 12A, which allows for translation along the laser beam as shown by a two-arrow line. The KIM laser 50 further includes folded concave dielectric coated mirror with high reflectivity at laser wavelength (and optional high transmission at pump and/or SHG, THG, FHG, SFG, DFG wavelengths) 5. It also has a plane mirror 6 with high reflectivity at laser wavelength (dielectric or metal coated), optional polarization components and components for dispersion compensation, such as prism 7, configured as a plane parallel plate mounted in the laser resonator at Brewster's angle. The disclosed KLM laser further includes an output coupler 8 transmissive to output laser beam 9 at the fundamental wavelength, and secondary outputs 10 transmissive to SHG wave (and/or THG, FHG, SFG, DFG wavelengths). The path of the laser beam is shown by red color and the pump beam is shown by green color.

Kerr-lens mode locked lasers rely on the Kerr effect: a nonlinear optical effect occurring when intense light propagates in optical medium; it can be described as instantaneously occurring modification of the refractive index of the medium. The "strength" of the Kerr effect is proportional to the optical intensity: $S_{Kerr} \sim I$. Therefore, the tight focusing of the laser beam in the gain medium is essential in KLM lasers. The required focusing is usually achieved by placing the gain medium between the two curved mirrors in the waist of the laser beam and by optimization of the distance between the curved mirrors. The waist of the laser beam is schematically shown in FIG. 12A. The optical intensity is proportional to the laser beam area and hence it reaches maximum in the waist and decreases with increase of the beam size.

The experiments show that polycrystalline TM:II-VI medium is suitable material for KLM lasers. The experiments also show that polycrystalline TM:II-VI medium is rather an efficient SHG converter for mid-IR fs pulses as disclosed above. The "strength" of the SHG effect is proportional to the optical intensity squared: $S_{SHG} \sim I^2$.

Thus, two nonlinear effects simultaneously occur in polycrystalline TM:II-VI KLM laser: Kerr lensing (proportional to I) and SHG (proportional to $I^2$). Different dependences of the Kerr lensing and of SHG on the optical intensity allows to vary the relative "strengths" of two nonlinear effects by translation of the polycrystalline TM:II-VI gain element along the waist of the laser beam Thus, the nonlinear action of polycrystalline TM:II-VI medium can be redistributed between those two nonlinear effects in a controllable manner.

Figures 13, 13A, 13B:
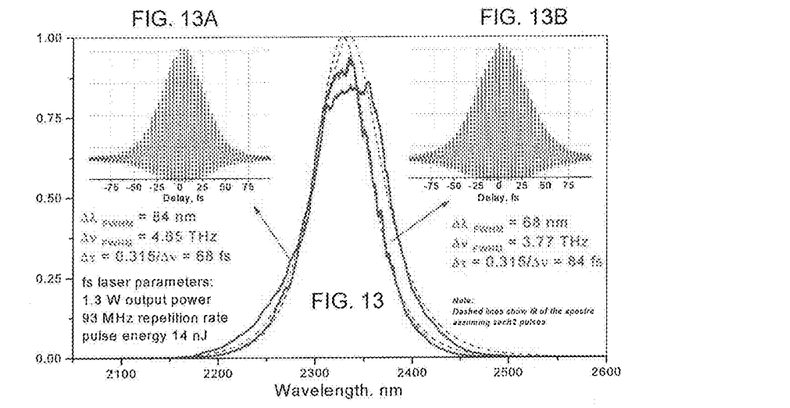
FIGS. 13, 13A and 13B illustrates the controllable generation of 68 fs and 84 fs pulses by the inventive KLM laser.
Figure 14:
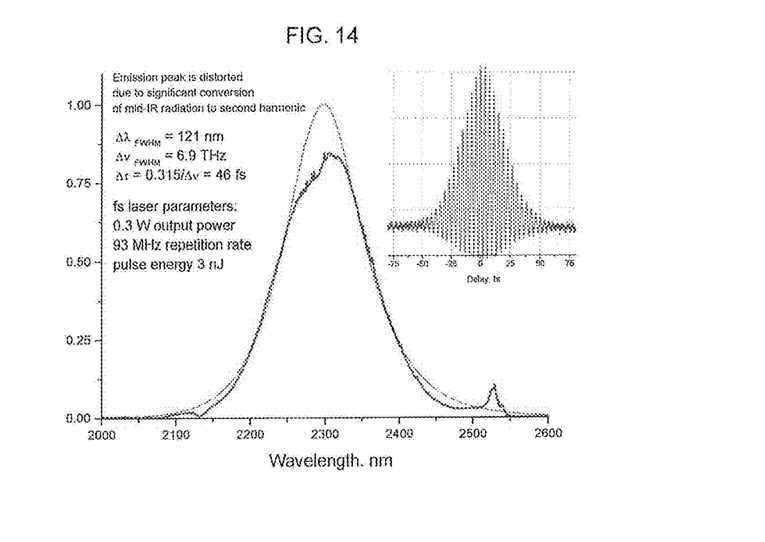
FIG. 14 illustrates the controllable generation of 46 fs pulse by the inventive KLM laser.

In particular, FIGS. 13, 13A and 13B illustrate the emission spectra, autocorrelation traces obtained for two locations (in red and blue) of gain medium 4' with respect to the curved mirrors 3 and 5 of FIG. 12. As can be seen, translation of the polycrystalline Cr:ZnS gain element resulted in significant variation of the fs laser parameters: pulse duration was reduced from 84 fs to 68 fs (the width of the emission spectrum has proportionally increased). Thus, proposed method allows for precise adjustment of fs laser parameters. Furthermore, translation of the polycrystalline Cr:ZnS gain element resulted in variation of fs laser output power at SHG wavelength (between ~10 mW and ~20 mW). The increase of the SHG output is exhibited by a distortion of the laser emission spectrum at fundamental wavelength (high SHG output corresponds to the flat-top emission peak as a significant fraction of the laser emission is converted to SHG). Referring to FIG. 14, the ability for precise control of the polycrystalline TM:II-VI KLM laser parameters results a 46 fs pulse duration, which as mentioned before has never been obtained in the prior art related to mid-IR TM:II-VI KLM lasers.

The simultaneous presence of the Kerr effect and of strong enough SHG effect in the polycrystalline TM:II-VI materials has following important applications:

(i) Translation of the polycrystalline TM:II-VI gain element, which is mounted inside the planar resonator of the KLM laser, along the waist of the laser beam allows for precise redistribution of the fs laser power between the primary output at fundamental wavelength and secondary output at SHG, THG, FHG, SFG, DFG wavelengths.

(ii) Translation of the polycrystalline TM:II-VI gain element, which is mounted inside the planar resonator of the KLM laser, along the waist of the laser beam allows for precise control of fs laser parameters (pulse duration, width and shape of the emission spectrum).

(iii) Simultaneous presence of the Kerr effect and of strong enough SHG effect in the polycrystalline TM:II-VI materials enables generation of shorter laser pulses (if compared with conventional Kerr-lens mode locked regime).

A variety of changes of the disclosed structure may be made without departing from the spirit and essential characteristics thereof. Thus, it is intended that all matter contained in the above description should be interpreted as illustrative only and in a limiting sense, the scope of the disclosure being defined by the appended claims.

The invention claimed is:

1. A Kerr Lens Mode Locked ("KLM") laser comprising:
a resonant cavity; and
a gain medium selected from polycrystalline transition metal doped II-VI materials ("TM:II-VI"), the gain medium being cut at a normal angle of incidence and mounted in the resonant cavity so as to induce Kerr-lens mode locking sufficient for the resonant cavity to emit a train of ultrashort pulses of a laser beam at a fundamental wavelength, wherein ultrashort pulses of the emitted laser beam at the fundamental wavelength, ranging from 1.8 µm to 8 µm, each have a pulse duration equal to at least 30 femtosecond ("fs") and an average output power of at most 20 watts ("W"), the gain medium being configured with a plurality of microscopic single-crystal grains which are non-uniformly dimensioned and have, differently oriented crystallographic axes.

2. The KLM laser of claim 1, wherein the gain medium generates second, third and fourth harmonic wavelengths of the fundamental wavelength.

3. The KLM laser of claim 1, wherein the resonant cavity is planar.

4. The KLM laser of claim 1, wherein the gain medium includes TM doped binary and ternary materials.

5. The KLM laser of claim 4, wherein the materials include Cr2+:ZnSe, Cr2+:ZnS, Cr2+:CdSe, Cr2+:CdS, Cr2+:ZnTe, Cr2+:CdMnTe, Cr2+:CdZnTe, Cr2+:ZnSSe, Fe2+:ZnSe, Fe2+:ZnS, Fe2+:CdSe, Fe2+:CdS, Fe2+:ZnTe, Fe2+:CdMnTe, Fe2+:CdZnTe, Fe2+:ZnSSe.

6. The KLM laser of claim 1 further comprising a linearly polarized fiber laser pump source selected from an erbium or thulium doped single mode fiber and operative to emit a pump beam which is coupled into the gain medium at a pump wavelength different from the fundamental wavelength, wherein the laser and pump beams remain circular while propagating through the gain medium.

7. The KLM laser of claim 6, wherein the gain medium is configured to uniformly release heat in response to the coupled pump beam which generates various uniform, axially symmetric thermal-optical effects inside the pumped gain medium.

8. The KLM laser of claim 1, wherein the optical intensity inside the gain medium is increased by a factor of n if compared with a conventional Brewster mounting scheme.

9. The KLM laser of claim 1, wherein the gain medium is configured to substantially compensate for astigmatism of the resonant cavity.

10. The KLM laser of claim 6, wherein the resonant cavity includes at least two adjacent upstream and downstream dielectrically coated folded mirrors spaced apart along a path of the pump beam and each configured with a high reflectivity at the fundamental wavelength and high transmission at the pump wavelength, the gain medium being located between and spaced from the folded mirrors, the downstream folded mirror being configured to at least partially transmit the high harmonic wavelength.

11. The KLM laser of claim 10, wherein the resonant cavity further includes a partially transmitting at the fundamental wavelength output coupler, and at least one plane dichroic mirror upstream from the output coupler and configured with the high reflectivity at the fundamental wavelength, and at least one intermediary plate with high transmission at the fundamental and high harmonic wavelength.

12. The KLM laser of claim 10, wherein the resonant cavity further includes a dispersion compensation element configured as a plane parallel plate or prism and operative to limit a dispersion, which is mounted at a Brewster angle.

13. The KLM laser of claim 10, wherein the resonant cavity further includes a Brewster mounted birefringent tuner.

14. The KLM laser of claim 10 further comprising a translation stage displacing the gain medium within the resonant cavity along a waist of the laser beam to controllably redistribute the average power of the laser beam among a primary output of the emitted laser beam at the fundamental wavelength and secondary outputs at respective second, third and fourth harmonic wavelengths.

* * * * *